(12) United States Patent
Lee et al.

(10) Patent No.: US 10,400,661 B2
(45) Date of Patent: Sep. 3, 2019

(54) ENGINE COOLING SYSTEM, ELECTRONIC THERMOSTAT CONTROL SYSTEM AND CONTROL METHOD FOR THE SAME

(71) Applicants: Hyundai Motor Company, Seoul (KR); Kia Motors Corporation, Seoul (KR); Inzicontrols Co., Ltd., Siheung-si (KR)

(72) Inventors: Philgi Lee, Suwon-si (KR); Gyuhwan Kim, Suwon-si (KR); Jae Suk Park, Suwon-si (KR); Yong Jeong Kim, Ansan-si (KR)

(73) Assignees: Hyundai Motor Company, Seoul (KR); Kia Motors Corporation, Seoul (KR); Inzicontrols Co., Ltd., Siheung-si (KR)

( * ) Notice: Subject to any disclaimer, the term of this patent is extended or adjusted under 35 U.S.C. 154(b) by 75 days.

(21) Appl. No.: 15/660,706

(22) Filed: Jul. 26, 2017

(65) Prior Publication Data

US 2017/0321596 A1 Nov. 9, 2017

Related U.S. Application Data

(62) Division of application No. 13/746,948, filed on Jan. 22, 2013, now Pat. No. 9,759,121.

(30) Foreign Application Priority Data

Apr. 10, 2012 (KR) .......................... 10-2012-0037226

(51) Int. Cl.
 *G05D 23/185* (2006.01)
 *G05D 23/30* (2006.01)
(Continued)

(52) U.S. Cl.
 CPC ................. *F01P 7/16* (2013.01); *F01P 7/167* (2013.01); *F01P 2070/04* (2013.01);
(Continued)

(58) Field of Classification Search
 CPC ... F01P 7/16; F01P 7/167; F25B 49/00; F25B 49/005; F25B 49/02; F25B 2700/21;
(Continued)

(56) References Cited

U.S. PATENT DOCUMENTS

| 4,838,037 A | 6/1989 | Wood |
| 5,301,513 A * | 4/1994 | Duff .................. G05D 23/1912 417/7 |

(Continued)

FOREIGN PATENT DOCUMENTS

| CN | 1160123 A | 9/1997 |
| CN | 1796738 A | 7/2006 |

(Continued)

*Primary Examiner* — Edward F Landrum
*Assistant Examiner* — Daniel C Comings
(74) *Attorney, Agent, or Firm* — Morgan, Lewis & Bockius LLP

(57) ABSTRACT

An electronic thermostat control system may include a control duty determination portion outputting PWM duty signal for controlling the coolant temperature according to a coolant temperature, a rising rate of the coolant temperature, an engine speed, a load and a vehicle speed, a driving portion applying a time condition to the PWM duty signal output by the control duty determination portion for controlling outputting interval, and a fault diagnosis portion diagnosing operations of the electronic thermostat by analyzing the signals output by the driving portion and changes of the coolant temperature.

2 Claims, 4 Drawing Sheets

(51) Int. Cl.
  *G05D 23/27* (2006.01)
  *G05D 23/19* (2006.01)
  *F01P 7/16* (2006.01)
  *G05D 23/275* (2006.01)

(52) U.S. Cl.
  CPC ... *F25B 2600/25* (2013.01); *F25B 2600/2515* (2013.01); *G05D 23/1852* (2013.01); *G05D 23/1856* (2013.01); *G05D 23/1921* (2013.01); *G05D 23/1925* (2013.01); *G05D 23/275* (2013.01); *G05D 23/27537* (2013.01); *G05D 23/27541* (2013.01); *G05D 23/30* (2013.01); *G05D 23/303* (2013.01)

(58) Field of Classification Search
  CPC .... F25B 2700/2117; F25B 2700/21175; F25B 2600/25; F25B 2600/2515; G05D 23/1852; G05D 23/1921; G05D 23/1925; G05D 23/30; G05D 23/303; G05D 23/275; G05D 23/27537; G05D 23/27541
  See application file for complete search history.

(56) References Cited

U.S. PATENT DOCUMENTS

2004/0231349 A1* 11/2004 Ikura .................. B60H 1/322
  62/236
2012/0111956 A1* 5/2012 Kinomura ............ F01P 7/167
  236/93 R

FOREIGN PATENT DOCUMENTS

| | | | |
|---|---|---|---|
| CN | 102086801 A | 6/2011 | |
| JP | 9-303912 | * 11/1997 | ............. F25B 49/02 |
| JP | 2001-329840 A | 11/2001 | |
| JP | 4139035 B2 | 6/2008 | |
| JP | 4385492 B2 | 10/2009 | |
| JP | 2011-021482 A | 2/2011 | |
| KR | 10-0521913 B1 | 10/2005 | |
| WO | WO 2011/067861 A1 | 9/2011 | |

* cited by examiner

ENGINE COOLING SYSTEM, ELECTRONIC THERMOSTAT CONTROL SYSTEM AND CONTROL METHOD FOR THE SAME

CROSS-REFERENCE TO RELATED APPLICATION

The present application is a divisional of U.S. patent application Ser. No. 13/746,948, filed Jan. 22, 2013, which claims priority to Korean Patent Application No. 10-2012-0037226 filed on Apr. 10, 2012, the entire contents of which are incorporated herein for all purposes by these references.

BACKGROUND OF THE INVENTION

Field of the Invention

The present invention relates to an engine cooling system, an electronic thermostat control system and a control method for the same which may actively control coolant temperature according to an operation condition of a vehicle and implement fault diagnosis so as to satisfy OBD (On Board Diagonostics) regulations.

Description of Related Art

In a combustion stroke, high temperature about 2000-2500° C. generated within an engine is transmitted to cylinder walls, a cylinder head, a piston valve and so on so as to deteriorate strength of elements. So, breakdown, lift-shortening, knocking, early ignition may occur.

If the engine is over cooled for solving the above problems, efficiency of the engine may be deteriorated and fuel consumption may be increased.

So, a thermostat is provided to an engine for maintaining coolant temperature within about 80-90° C.

The thermostat is disposed between the engine and the radiator and changes displacement of a valve according to changes of coolant temperature, and thus flowing amount flowing through the radiator is adjusted. Accordingly, the coolant is maintained within appropriate temperature, for example about 80-90° C.

That is, the thermostat changes the displacement of the valve for the coolant to flow through the radiator when the coolant temperature is higher than a predetermined temperature, and the valve is closed to bypass the radiator if the coolant temperature is less than a predetermined temperature.

A mechanical thermostat expands wax provided thereto depending only on a temperature of the coolant, and therefore, the mechanical thermostat may not be operated actively against changes of the driving circumstances of the vehicle.

Furthermore, while cooling systems of a vehicle are generally designed to satisfy the toughest driving condition, such as, a full load, for example, actual driving is generally conducted within about 70% of a full load. Accordingly, over cooling of the engine often occurs, which results in a decrease in engine efficiency, an increase in fuel consumption, and an increase in harmful exhaust particles.

In order to overcome these drawbacks, several attempts have been made to provide an adjustable electronic thermostat valve that optimizes the coolant temperature.

One such electronic thermostat is an electronic thermostat valve having a heating means that cooperates with expansion of a wax element. The electronic thermostat valve includes a plug for supplying electronic power and a heater for heating the wax.

The electric power supplied to the heater changes upon driving conditions such as speed of a vehicle, temperature of intake air, and load conditions.

However, a drawback of this electronic thermostat is that the thermostat may not actively response to variable conditions such as operation conditions of a vehicle, rising or descending of coolant temperature and so on.

Also, diagnosis functions for detecting malfunction of the cooling system is not included and thus it may not satisfy OBD regulations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electronic thermostat control system and a control method for the same which may actively control coolant temperature according to an operation condition of a vehicle and implement fault diagnosis so as to satisfy OBD (On Board Diagonostics) regulations.

In an aspect of the present invention, an electronic thermostat control system may include an electronic thermostat provided with a heater and disposed in a coolant line connecting an engine and a radiator for controlling flowing direction and amount of coolant, a coolant temperature sensor detecting coolant temperature exhausted from the engine, and a control portion controlling operations of the electronic thermostat according to the coolant temperature and driving conditions of a vehicle, wherein the control portion controls operation state of the heater as 100% when a detected coolant temperature by the coolant temperature sensor is higher than a predetermined maximum temperature, wherein the control portion controls the operation state of the heater as 0% when the detected coolant temperature by the coolant temperature sensor is less than a predetermined minimum temperature, and wherein the control portion controls the operation state of the heater as gradually increased or decreased according to change tendency of the coolant temperature for the coolant not to be hunted when the detected coolant temperature is below the predetermined maximum temperature and higher than the predetermined minimum temperature.

The control portion applies a predetermined time condition to a PWM duty signal to be supplied or cut off repeatedly to the heater provided to the electronic thermostat for preventing overheating of the heater.

In a state of controlling the heating of the heater, the control portion determines malfunction of the electronic thermostat, stores diagnosis code, and outputs corresponding message when changes of the coolant temperature does not follow a target temperature.

The control portion determines malfunction of the electronic thermostat, stores diagnosis code, and outputs corresponding message when real PWM duty signal supplied to the heater of the electronic thermostat does not correspond to PWM duty signal for controlling the heater applied by the control portion.

The control portion may include a control duty determination portion outputting PWM duty signal for controlling the detected coolant temperature according to a coolant temperature, a rising rate of the detected coolant temperature, an engine speed, a load and a vehicle speed, a driving portion applying a time condition to the PWM duty signal output by the control duty determination portion for controlling outputting interval, and a fault diagnosis portion diagnosing operations of the electronic thermostat by analyzing the signals output by the driving portion and changes of the detected coolant temperature.

The control portion outputs PWM duty signal for controlling the coolant temperature as 100% when the detected coolant temperature is higher than a predetermined maximum temperature, wherein the control portion outputs the PWM duty signal for controlling the coolant temperature as 0% when the detected coolant temperature is less than a predetermined minimum temperature, and wherein when the detected coolant temperature is below the predetermined maximum temperature and higher than the predetermined minimum temperature, the control portion determines whether rising condition or descending condition of the coolant temperature, and outputs the PWM duty signal for controlling the coolant temperature as gradually increased or decreased.

At a state that the coolant temperature is higher than the predetermined minimum temperature, the control duty determination portion outputs the PWM duty signal as 100% when any one of conditions that the rising rate of the coolant temperature is higher than a predetermined standard rising rate, the engine speed is higher than a predetermined standard rotation speed, the load is higher than a predetermined standard load, the vehicle speed is higher than a predetermined standard vehicle speed.

The control duty determination portion outputs the PWM duty signal as gradually increased when the coolant temperature is higher than the predetermined minimum temperature, the coolant temperature is higher than a predetermined reference temperature, and a difference between the coolant temperature and a target temperature is less than a predetermined high temperature determination value.

The control duty determination portion outputs the PWM duty signal as 100% when the coolant temperature is higher than the predetermined minimum temperature, the coolant temperature is higher than a predetermined reference temperature, and a difference between the coolant temperature and a target temperature is more than a predetermined high temperature determination value.

The control duty determination portion outputs the PWM duty signal as gradually decreased when the coolant temperature is higher than the predetermined minimum temperature, the coolant temperature is less than a predetermined reference temperature, and a difference between a target temperature and the coolant temperature is less than a predetermined low temperature determination value.

The control duty determination portion outputs the PWM duty signal as 0% when the coolant temperature is higher than the predetermined minimum temperature, the coolant temperature is less than a predetermined reference temperature, and a difference between a target temperature and the coolant temperature is higher than a predetermined low temperature determination value.

The control duty determination portion may include a first comparator comparing the detected coolant temperature with the predetermined maximum temperature, a second comparator comparing the detected coolant temperature with the predetermined minimum temperature, a third comparator comparing rising rate of the detected coolant temperature with a standard rising rate, a fourth comparator comparing an engine speed with a standard rotation speed, a fifth comparator comparing a load with a standard load, a sixth comparator comparing a vehicle speed with a standard vehicle speed, a seventh comparator comparing an output of the second comparator with a stored reference temperature and outputting to a high-side, an eighth comparator comparing the output of the second comparator with the stored reference temperature and outputting to a low-side, a first logical circuit logical summing outputs from the third comparator to the sixth comparator, a NOT circuit inverting a output of the first logical circuit, a second logical circuit implementing AND operation of the outputs of the second comparator and the first logical circuit, a third logical circuit implementing AND operation of outputs of the seventh comparator and the NOT circuit, a fourth logical circuit implementing AND operation of outputs of the eighth comparator and the NOT circuit, a fifth logical circuit implementing AND operation of the outputs the first comparator and the second logical circuit, a sixth and seventh logical circuits implementing AND operation of the output of the third logical circuit and a compared result of a high temperature determination value and a difference between the detected coolant temperature and a predetermined target temperature, and an eighth and ninth logical circuits implementing AND operation of the output of the eighth comparator and a compared result of a low temperature determination value and a difference between the detected coolant temperature and the predetermined target temperature.

The driving portion outputs 100% duty signal at B time interval when the control duty determination portion outputs the PWM duty signal as 100%, wherein the driving portion adjusts output interval by applying A time after the B time interval.

The driving portion may include a logical circuit implementing AND operation of the PWM duty signal output by the control duty determination portion and a predetermined reference value, a NAND circuit comparing output of the logical circuit and the PWM duty signal output by the control duty determination portion and outputting inverted output, a B time circuit maintaining the output of the logical circuit at predetermined B time, and an A time circuit applying a predetermined time to an output of the NAND circuit for adjusting output interval.

The fault diagnosis portion determines malfunction of the electronic thermostat when changes of the detected coolant temperature does not follow a target temperature, or real PWM duty signal supplied to the heater of the electronic thermostat does not correspond to PWM duty signal for controlling the heater applied by the control portion.

The fault diagnosis portion may include a first comparator comparing the detected coolant temperature with a malfunction determination temperature and outputting to a high-side, a second comparator comparing the detected coolant temperature with the malfunction determination temperature and outputting to a low-side, a first logical circuit implementing AND operation of an output of the control duty determination portion and "0", a second logical circuit implementing AND operation of an output of the first comparator and "0", a third logical circuit implementing AND operation of an output of the second comparator and "1", a fourth logical circuit implementing AND operation of the output of the control duty determination portion and "1", a fifth logical circuit implementing AND operation of the output of the control duty determination portion and heater output value, a sixth logical circuit implementing AND operation of the outputs of the first logical circuit and the second logical circuit, a seventh logical circuit implementing AND operation of outputs of the third logical circuit and the fourth logical circuit, and an eighth logical circuit logical summing the outputs of the fifth logical circuit, the sixth logical circuit and the seventh logical circuit and outputting OBD signal of the electronic thermostat.

In another aspect of the present invention, a control method for an electronic thermostat control system, may include detecting operation states of a vehicle including a coolant temperature, a rising rate of the detected coolant temperature, an engine speed, a load and a vehicle speed, determining whether the detected coolant temperature is within a predetermined temperature range, determining whether coolant temperature change satisfies a rising control condition or a descending control condition when the detected coolant temperature is within the predetermined temperature range, and adjusting the detected coolant temperature by controlling an operation of an electronic thermostat, and diagnosing malfunction of the electronic thermostat by comparing a target temperature with the detected coolant temperature controlled by the electronic thermostat.

A valve of the electronic thermostat is opened fully for a coolant flowing through a radiator maximized when the detected coolant temperature is higher than a maximum temperature of the predetermined temperature range, wherein the valve of the electronic thermostat is closed fully for the coolant flowing through the radiator minimized when the detected coolant temperature is less than a minimum temperature of the predetermined temperature range.

The malfunction of the thermostat is determined when changes of the detected coolant temperature does not follow a target temperature, or the changes of the detected coolant temperature does not correspond to a control of the electronic thermostat, and outputting warning message.

In further another aspect of the present invention, an engine cooling system may include an engine, a radiator radiating heat absorbed to a coolant, an electronic thermostat disposed on a coolant line connecting the engine and the radiator and adjusting flowing direction of the coolant, and a control system controlling an operation of the electronic thermostat to adjust coolant temperature, wherein the control system is determined as malfunction when changes of coolant temperature does not follow a target temperature, or changes of the coolant temperature does not correspond to control of the electronic thermostat.

In an exemplary embodiment of the present invention, the thermostat may actively response to variable conditions such as operation conditions of a vehicle, rising or descending of coolant temperature and so on.

In an exemplary embodiment of the present invention, diagnosis functions for detecting malfunction of the cooling system is included and thus it may satisfy OBD regulations.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
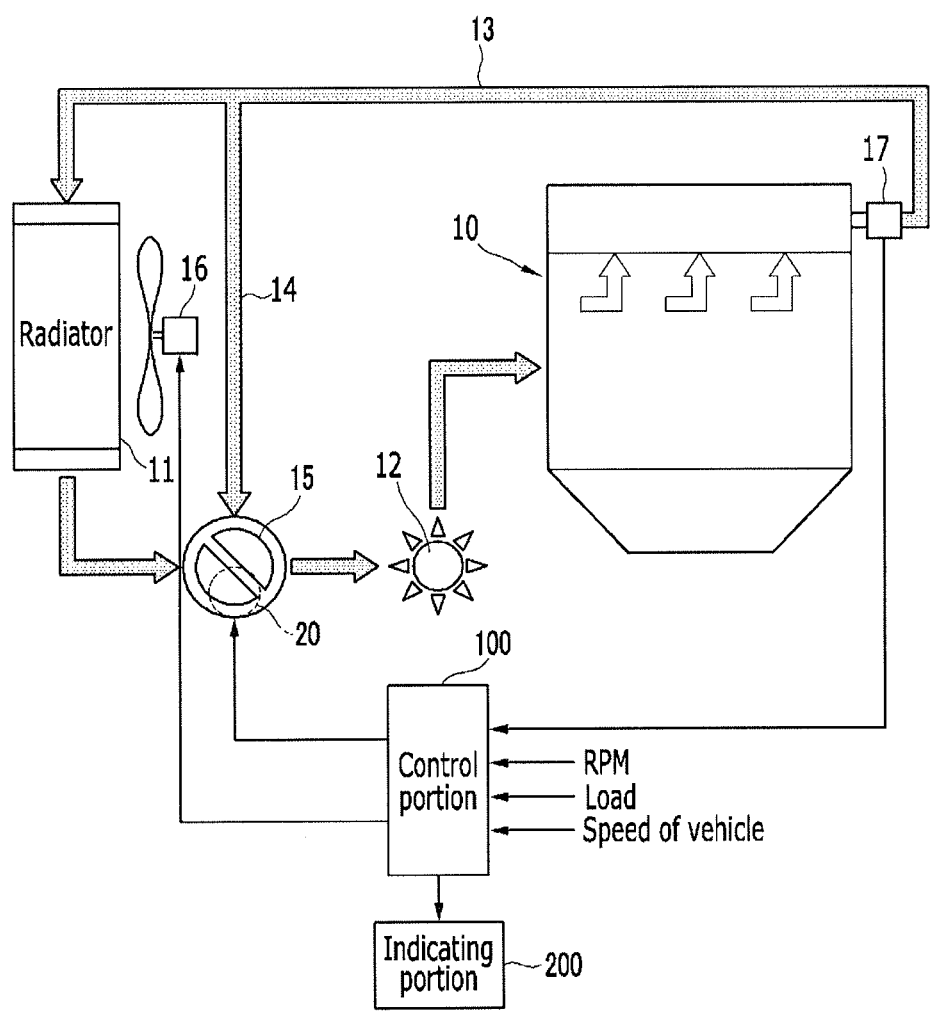
FIG. 1 is a drawing showing an engine cooling system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

A size and a thickness of each element illustrated in the drawing are arbitrarily represented for the convenience of description, so that the present invention is not essentially limited to the drawings, and a thickness is expanded in order to clearly express several parts and regions.

FIG. 1 is a drawing showing an engine cooling system according to an exemplary embodiment of the present invention.

Referring to FIG. 1, an engine cooling system according to an exemplary embodiment of the present invention includes an engine 10, a radiator 11, a coolant pump 12, a coolant line 13, a bypass line 14, an electronic thermostat 15, a cooling fan motor 16, a coolant temperature sensor 17 and a control portion 100.

The coolant line 13 connects the engine 10 and the radiator 11, and the coolant pump 12 and the electronic thermostat 15 are disposed on the coolant line 13.

The radiator 11 radiates heat absorbed to coolant to ambient. Operations of the cooling fan motor 16 are controlled according to control signals from the control portion 100 based on coolant temperature conditions and vehicle's driving conditions.

The coolant pump 12 is disposed on the coolant line 13 connecting the electronic thermostat 15 and the engine 10 and allows the coolant to flow.

The coolant pump 12 may be an electronic water pump which may be operated according to control signals from the control portion 100.

The electronic thermostat 15 is provided with a heater 20 of which heating value may be controlled by PWM duty signal of the control portion 100 according to vehicle's driving condition so as to adjust expansion of a wax within the electronic thermostat 15. If the heater 20 outputs heat to expand the wax, opening amount of a valve is controlled, and thus flowing amount and direction of the coolant through the radiator 11 or the bypass line 14 is controlled.

The coolant temperature sensor 17 detects coolant temperature exhausted from the engine 10 and transmits the corresponding signals to the control portion 100.

The control portion 100 receives the signals such as the coolant temperature ET detected by the coolant temperature sensor 17, an engine speed RPM, a load LOAD, a vehicle speed and so on, determines operations conditions of the engine operation, and then determines temperature conditions of the coolant. The control portion 100 outputs PWM duty signal for adjusting heating value of the heater 20 provided to the electronic thermostat 15, and thus opening amount of the valve may be actively controlled for maintaining the coolant temperature for optimized driving efficiency.

The control portion 100 outputs the PWM duty signal as 100% for the heater 20 to output the heating value as 100% if the detected coolant temperature ET by the coolant temperature sensor 17 is higher than a predetermined maximum temperature DETH and thus opening amount of the valve may be maximized.

So, the flowing amount of the coolant flowing though the radiator 11 is maximized to cool the engine 10.

The control portion 100 outputs the PWM duty signal as 0% for the heater 20 to output the heating value as 0% if the detected coolant temperature ET by the coolant temperature sensor 17 is less than a predetermined minimum temperature DETL.

In this case, the predetermined maximum temperature DETH and the minimum temperature DETL are determined by experiments for the coolant to be maintained within appropriate ranges based on material of the engine, operation state and so on.

And thus opening amount of the valve may be minimized for the coolant not to flow through the bypass line 14.

The control portion 100 outputs the PWM duty signal as gradually increased or decreased for the heater 20 to output the heating value as gradually increased or decreased according to the engine speed RPM, the load LOAD, the vehicle speed RPM, and the rising rate of the coolant temperature EdT if the detected coolant temperature ET is below the predetermined maximum temperature DETH and higher than the predetermined minimum temperature DETL.

Thus the opening amount of the valve of the electronic thermostat 15 is controlled according to the driving condition, and rising or descending conditions of the coolant temperature for controlling the amount of the coolant to flow through the radiator 11, so that fluctuating or hunting of the coolant temperature may be minimized.

When the control portion 100 outputs the PWM duty signal as 100% for the heater 20 to output the heating value as 100%, the heater 20 is heated at a predetermined interval for preventing from overheating of the heater 20 and disconnection due to overheat.

At a state that the control portion 100 controls the heating value of the heater 20 provided to the electronic thermostat 15, the control portion 100 determines malfunction of the thermostat 15, stores diagnosis code, and outputs warning message through an indicating portion 200 if temperature changes of the coolant is not within a predetermined ranges.

The predetermined ranges are arbitrary value for determining whether the current coolant temperature follow a target temperature or not.

The control portion 100 determines malfunction of the electronic thermostat 15 if real PWM duty signal supplied to the heater 20 of the electronic thermostat 15 does not correspond to PWM duty signal for controlling the heater 20 applied by the control portion 100. And then the control portion 100 stores diagnosis code, and outputs warning message.

Figure 2:
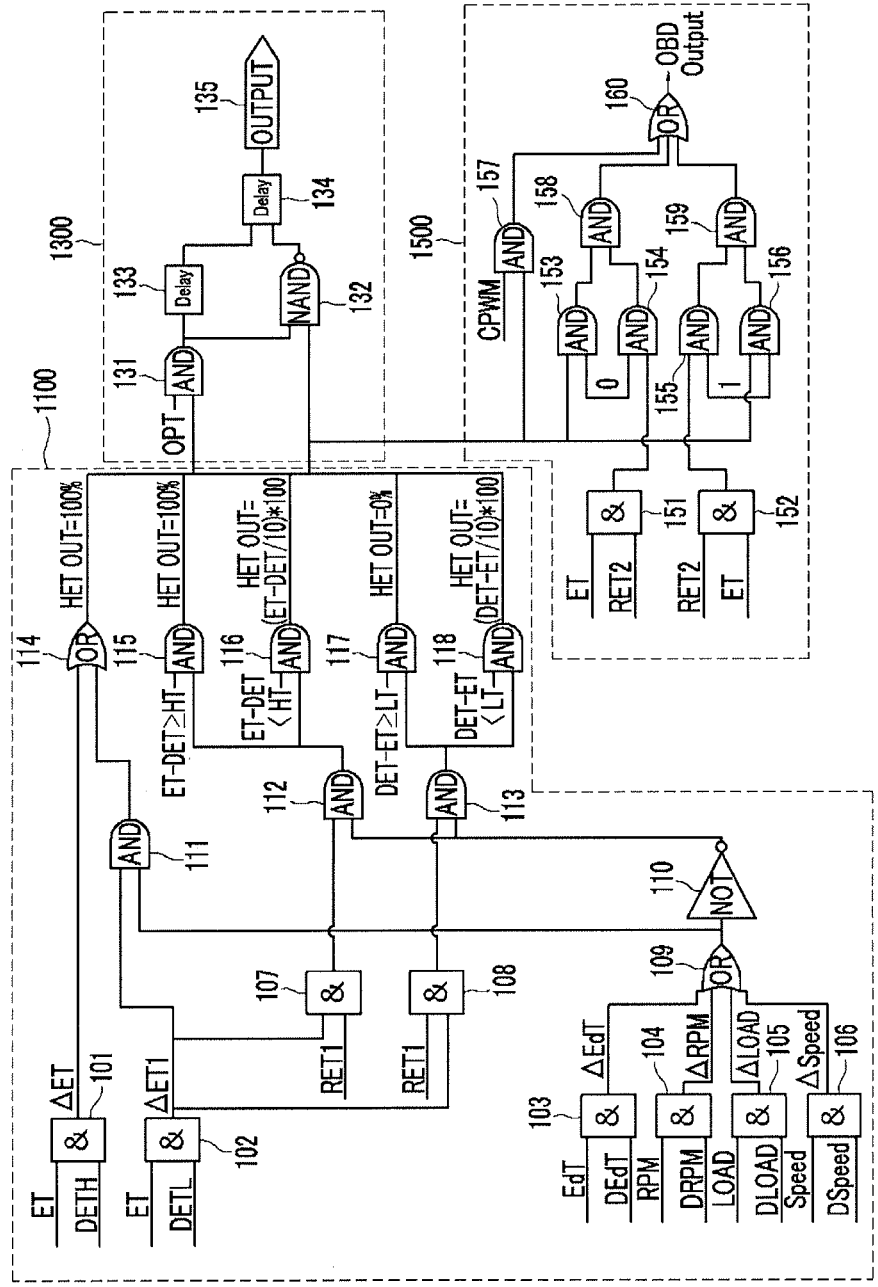
FIG. 2 is a drawing showing a control portion of an electronic thermostat control system according to an exemplary embodiment of the present invention.

FIG. 2 is a drawing showing a control portion of an electronic thermostat control system according to an exemplary embodiment of the present invention.

Referring to FIG. 2, the control portion 100 includes a control duty determination portion 1100, a driving portion 1300 and a fault diagnosis portion 1500.

The control duty determination portion 1100 outputs the PWM duty signal for controlling the coolant temperature according to the coolant temperature ET, the rising rate of the coolant temperature EdT, the engine speed RPM, the load LOAD, and the vehicle speed.

The control duty determination portion 1100 outputs the PWM duty signal as 100% for the heater 20 to output the heating value as 100% if the detected coolant temperature ET is higher than the predetermined maximum temperature DETH.

The control duty determination portion 1100 outputs the PWM duty signal as 0% for the heater 20 to output the heating value as 0% if the detected coolant temperature ET is less than a predetermined minimum temperature DETL.

The control duty determination portion 1100 outputs the PWM duty signal as gradually increased or decreased according to the engine speed RPM, the load LOAD, the vehicle speed RPM, and the rising rate of the coolant temperature EdT if the detected coolant temperature ET is below the predetermined maximum temperature DETH and higher than the predetermined minimum temperature DETL.

At a state that the coolant temperature ET is higher than the predetermined minimum temperature DETL, the control duty determination portion 1100 outputs the PWM duty signal as 100% if any one of conditions that the rising rate of the coolant temperature EdT is higher than a predetermined standard rising rate DEdT, an engine speed (rotation speed, RPM) is higher than a predetermined standard rotation speed DRPM, a load LOAD is higher than a predetermined standard load DLOAD, and a vehicle speed is higher than a predetermined standard vehicle speed DSpeed.

The predetermined standard rising rate DEdT, the predetermined standard rotation speed DRPM, the predetermined standard load DLOAD, the predetermined standard vehicle speed DSpeed are arbitrary values for determining maximum efficiency cooling is required and the values may be predetermined by experiments.

At a state that the coolant temperature ET is higher than the predetermined minimum temperature DETL, the control duty determination portion 1100 outputs the PWM duty signal as gradually increased if the rising rate of the coolant temperature EdT is less than the predetermined standard rising rate DEdT, the engine speed (rotation speed, RPM) is less than the predetermined standard rotation speed DRPM, the load LOAD is less than the predetermined standard load DLOAD, the vehicle speed is less than the predetermined standard vehicle speed DSpeed, the coolant temperature ET is higher than a predetermined reference temperature RET1, and a difference between the coolant temperature ET and a target temperature DET is less than a predetermined high temperature determination value HT.

The control duty determination portion 1100 outputs the PWM duty signal as 100% if the coolant temperature ET is higher than the predetermined reference temperature RET1, and the difference between the coolant temperature ET and a target temperature DET is higher than the predetermined high temperature determination value HT.

The target temperature DET may be determined according to the rising rate of the coolant temperature EdT, the engine speed RPM, the load LOAD, the vehicle speed and so on, and the target temperature DET may be stored in a map through experiments.

At a state that the coolant temperature ET is higher than the predetermined minimum temperature DETL, the control duty determination portion 1100 outputs the PWM duty signal as gradually decreased if the rising rate of the coolant temperature EdT is less than the predetermined standard rising rate DEdT, the engine speed (rotation speed, RPM) is less than the predetermined standard rotation speed DRPM, the load LOAD is less than the predetermined standard load DLOAD, the vehicle speed is less than the predetermined standard vehicle speed DSpeed, the coolant temperature ET is less than the predetermined reference temperature RET1, and the difference between the coolant temperature ET and the target temperature DET is less than a predetermined low temperature determination value LT.

The control duty determination portion 1100 outputs the PWM duty signal as 0% if the coolant temperature ET is less than the predetermined reference temperature RET1, and the difference between the coolant temperature ET and the target temperature DET is higher than the predetermined low temperature determination value LT.

The predetermined reference temperature RET1 may be a stored coolant temperature at a prior control cycle, and the high temperature determination value HT and the low temperature determination value LT may be temperatures for reflecting rising tendency and descending tendency of the coolant temperature respectively.

In this case, the gradual increasing of the PWM duty signal denotes a state where gradual descending of the coolant temperature is required, and the gradual decreasing of the PWM duty signal denotes a state where gradual increasing of the coolant temperature is required.

In this case, the 100% output of the PWM duty signal denotes a state where rapid descending of the coolant temperature is required, and the 0% output of the PWM duty signal denotes a state where rapid increasing of the coolant temperature is required.

The control duty determination portion 110 includes a first comparator 101 comparing the coolant temperature ET with the predetermined maximum temperature DETH and outputting the results, a second comparator 102 comparing the coolant temperature ET with the predetermined minimum temperature ETL and outputting the results, a third comparator 103 comparing rising rate of the coolant temperature EdT with the standard rising rate DEdT and outputting the results, a fourth comparator 104 comparing the engine speed RPM with the standard rotation speed DRPM and outputting the results, a fifth comparator 105 comparing the load LOAD with the standard load DLOAD and outputting the results, a sixth comparator 106 comparing the vehicle speed with the standard vehicle speed and outputting the results, a seventh comparator 107 comparing the output of the second comparator 102 with the stored reference temperature RET1 and outputting to a high-side Hi Side, an eighth comparator 108 comparing the output of the second comparator 102 with the stored reference temperature RET1 and outputting to a low-side Low Side, a first logical circuit 109 logical summing the outputs from the third comparator 106 to the sixth comparator 106 and outputting the results, a NOT circuit 110 inverting the output of the first logical circuit 109 and outputting the results, a second logical circuit 111 implementing AND operation of the outputs of the second comparator 102 and the first logical circuit 109 and outputting the results, a third logical circuit 112 implementing AND operation of the outputs of the seventh comparator 107 and the NOT circuit 110 and outputting the results, a fourth logical circuit 113 implementing AND operation of the outputs of the eighth comparator 108 and the NOT circuit 110 and outputting the results, a fifth logical circuit 114 implementing AND operation of the outputs the first comparator 101 and the second logical circuit 111 and outputting the results, a sixth and seventh logical circuits 115 and 116 implementing AND operation of the output of the third logical circuit 112 and a compared result of the high temperature determination value HT and a difference between the coolant temperature ET and the predetermined target temperature DET and outputting the results, and an eighth and ninth logical circuits 117 and 118 implementing AND operation of the output of the eighth comparator 108 and a compared result of the low temperature determination value LT and a difference between the coolant temperature ET and the predetermined target temperature DET and outputting the results.

The driving portion 1300 the PWM duty signal transmitted from the control duty determination portion 1100 supplies to the heater 20 provided to the electronic thermostat at a predetermined time interval for adjusting heating value of the heater 20.

The driving portion 1300 outputs 100% duty signal at B time interval if the control duty determination portion 1100 outputs the PWM duty signal as 100% for preventing the heater 20 from being disconnected due to overheating.

The driving portion 1300 adjusts output interval by applying A time after B time interval for preventing the heater 20 from being disconnected due to overheating if the control duty determination portion outputs the PWM duty signal is consistently maintained.

The driving portion 1300 includes a logical circuit 131 implementing AND operation of the PWM duty signal output by the control duty determination portion 1100 and a predetermined reference value OPT, a NAND circuit 132 comparing the output of the logical circuit 131 and the PWM duty signal output by the control duty determination portion 1100 and outputting inverted output, a B time circuit 133 maintaining the output of the logical circuit 131 at predetermined B time, and an A time circuit 134 applying a predetermined time to the output of the NAND circuit 132 for adjusting output interval.

The predetermined reference value OPT is an operating time determination duty which is predetermined for comparing with the PWM duty signal and controlling the operation time of the heater 20.

The fault diagnosis portion 1500 determines whether the coolant temperature follows the target temperature or not, and determines malfunction of the electronic thermostat if changes of the coolant temperature does not follow the target temperature, stores diagnosis code, and outputs warning message through the indicating portion 200.

The fault diagnosis portion 1500 determines malfunction of the electronic thermostat 15 if real PWM duty signal supplied to the heater 20 of the electronic thermostat 15 does not correspond to the PWM duty signal for controlling the heater 20, stores diagnosis code, and outputs warning message.

The fault diagnosis portion 1500 includes a first comparator 151 comparing the coolant temperature ET with a malfunction determination temperature RET2 and outputting to a high-side Hi Side, a second comparator 152 comparing the coolant temperature ET with the malfunction determination temperature RET2 and outputting to a low-side Low Side, a first logical circuit 153 implementing AND operation of the output of the control duty determination portion 1100 and "0", a second logical circuit 154 implementing AND operation of the output of the first comparator 151 and "0", a third logical circuit 155 implementing AND operation of the output of the second comparator 152 and "1", a fourth logical circuit 156 implementing AND operation of the output of the control duty determination portion 1100 and "1", a fifth logical circuit 157 implementing AND operation of the output of the control duty determination portion 1100 and heater output value CPWM, a sixth logical circuit 158 implementing AND operation of the outputs of the first logical circuit 153 and the second logical circuit 154, a seventh logical circuit 159 implementing AND operation of the outputs of the third logical circuit 155 and the fourth logical circuit 156, and an eighth logical circuit 160 logical summing the outputs of the fifth logical circuit 157, the sixth logical circuit 158 and the seventh logical circuit 159 and outputting OBD signal of the electronic thermostat.

The predetermined malfunction determination temperature RET2 is a temperature for determining normal operation of the electronic thermostat control system according to whether the PWM duty control is required or not.

Figure 3:
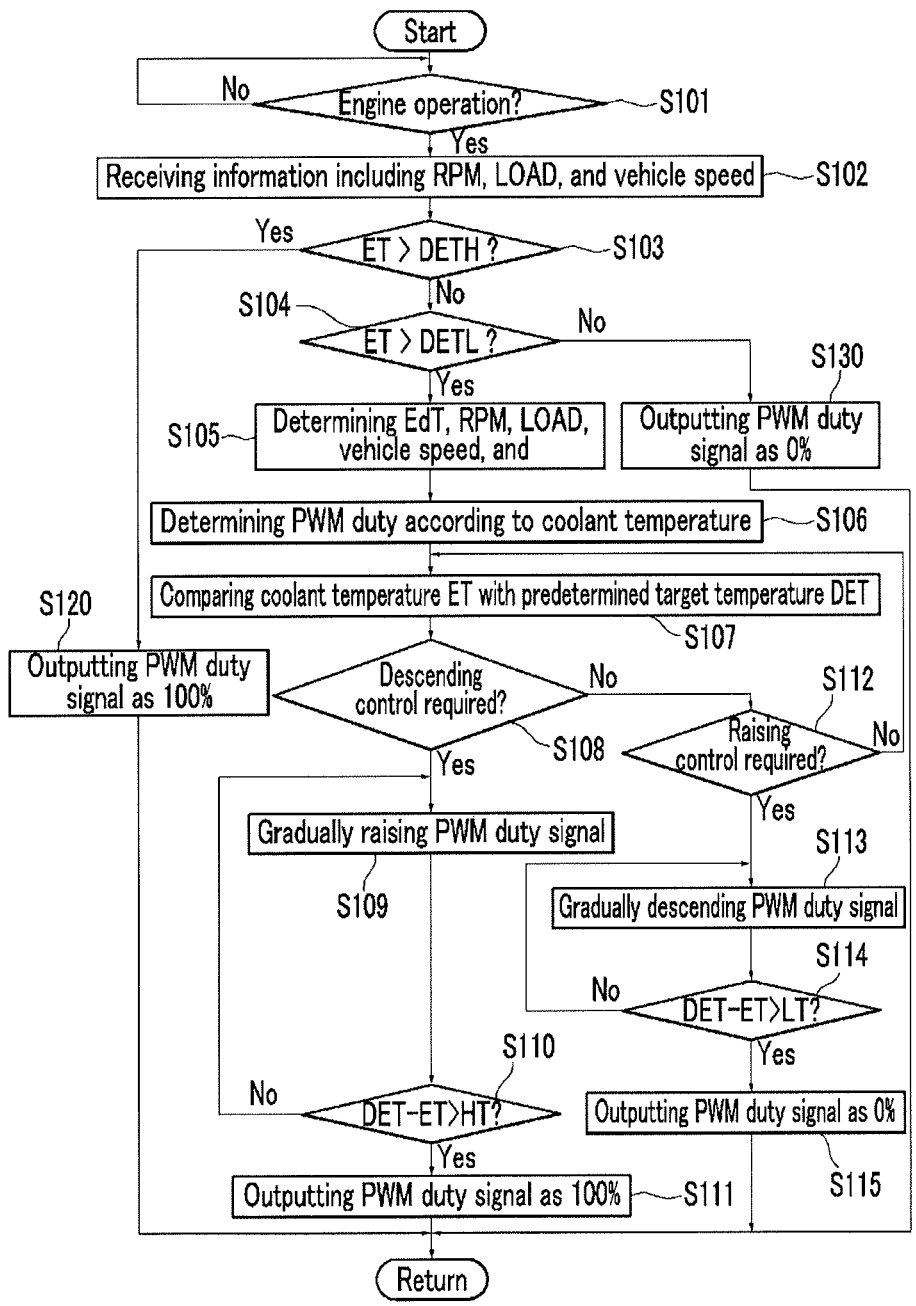
FIG. 3 is a flowchart of a control method for an electronic thermostat control system according to an exemplary embodiment of the present invention.

FIG. 3 is a flowchart of a control method for an electronic thermostat control system according to an exemplary embodiment of the present invention.

In an exemplary embodiment of the present invention, at operation state of the engine 10 (at the step S101), the control portion 100 receives information of the coolant temperature ET detected from the coolant temperature sensor 17, and also receives information including the engine speed RPM, the load LOAD, the vehicle speed and so on, and calculates the coolant temperature rising rate Edt based on the detected coolant temperature ET at the step S102.

Then the control portion 100 compares the coolant temperature ET with the predetermined maximum temperature DETH at the step S103.

At the step S103, it is determined that the coolant temperature ET is higher than the predetermined maximum temperature DETH, the control portion 100 outputs the PWM duty signal as 100% for the heating value of the heater 20 as 100% for the opening amount of the valve of electronic thermostat 15 to be maximized at the step S102.

Accordingly, the coolant exhausted from the engine 10 fully flows through the radiator 11 to cool the engine 10 efficiently.

If it is determined that the coolant temperature ET is not higher than the predetermined maximum temperature DETH at the S103, the control portion 100 compares the coolant temperature ET with the predetermined minimum temperature DETL at the step S104.

At the step S104, if it is determined that the coolant temperature ET is less than the predetermined minimum temperature DETL, the control portion 100 outputs the PWM duty signal as 0% for the heating value of the heater 20 as 0% at the step S130.

So, the coolant from the engine 17 is allowed to flow through the bypass line 14 for preventing coolant to be over cooled.

If it is determined that the coolant temperature ET is not higher than the predetermined maximum temperature DETH at the step 103 and the coolant temperature ET is higher than the predetermined minimum temperature DETL at the step S104, the control portion 100 determines the rising rate of the coolant temperature EdT, the engine speed RPM, the load LOAD, the vehicle speed, and the determines the PWM duty according to the coolant temperature ET at the step S106.

For example, the control portion 100 determines whether the rising rate of the coolant temperature EdT is higher than the predetermined standard rising rate DEdT or not, the engine speed RPM is higher than the predetermined standard rotation speed DRPM or not, the load LOAD is higher than the predetermined standard load DLOAD or not, the vehicle speed is higher than the predetermined standard vehicle speed DSpeed and so on, then determines the PWM duty according to the coolant temperature ET.

Then the control portion 100 compares the coolant temperature ET with the predetermined target temperature DET and the deviation and the changes of the temperature at the step S107, then determines whether descending control of the coolant temperature is required or not at the step S108.

At the step S108, if the descending control of the coolant temperature is required, the control portion 100 gradually raises the PWM duty signal for controlling the heater 20 for cooling the coolant at the step S109.

During the gradual raising the PWM duty signal at the step 109, the control portion 100 determines whether the difference between the coolant temperature ET and the predetermined target temperature DET is higher than the high temperature determination value HT or not at the step S110.

If the difference between the coolant temperature ET and the predetermined target temperature DET is higher than the high temperature determination value HT at the step S110, the control portion 100 outputs the PWM duty signal as 100% at the step S111.

For example, the control portion 100 outputs the PWM duty signal as gradually increased if the rising rate of the coolant temperature EdT is less than the predetermined standard rising rate DEdT, the engine speed RPM is less than the predetermined standard rotation speed DRPM, the load LOAD is less than the predetermined standard load DLOAD, the vehicle speed is less than the predetermined standard vehicle speed DSpeed, the coolant temperature ET is higher than the predetermined reference temperature RET1, and the difference between the coolant temperature ET and the target temperature DET is less than the predetermined high temperature determination value HT.

However, the control duty determination portion 1100 outputs the PWM duty signal as 100% if the difference between the coolant temperature ET and the target temperature DET is higher than the predetermined high temperature determination value HT.

If the descending control of the coolant temperature is not required at the step S108, the control portion 100 determines whether raising control of the coolant temperature is required or not at the step S112.

If the raising control of the coolant temperature is required at the step S112, the control portion 100 gradually descends the PWM duty signal for controlling the heater 20 for cooling the coolant at the step S113.

During the gradual descending the PWM duty signal at the step 113, the control portion 100 determines whether the difference between the coolant temperature ET and the predetermined target temperature DET is higher than the low temperature determination value LT or not at the step S114.

If the difference between the coolant temperature ET and the predetermined target temperature DET is higher than the low temperature determination value LT at the step S114, the control portion 100 outputs the PWM duty signal as 0% at the step S115.

With the control operations described above, since the opening amount of the valve of the electronic thermostat 15 according to the driving condition and the rising conditions or descending conditions of the coolant temperature, so the flowing amount flowing through the radiator 11 may be adjusted to and hunting of the coolant temperature may be prevented.

During the control of heating value of the heater 20 as showing in FIG. 3, the control portion 100 detects the coolant temperature ET and determines whether the coolant temperature ET follows the predetermined target temperature DET or not. If the coolant temperature ET does not follow the predetermined target temperature DET, the control portion 100 determines malfunction of the electronic thermostat 15, stores diagnosis code, and outputs warning message through the indicating portion 200.

Figure 4:
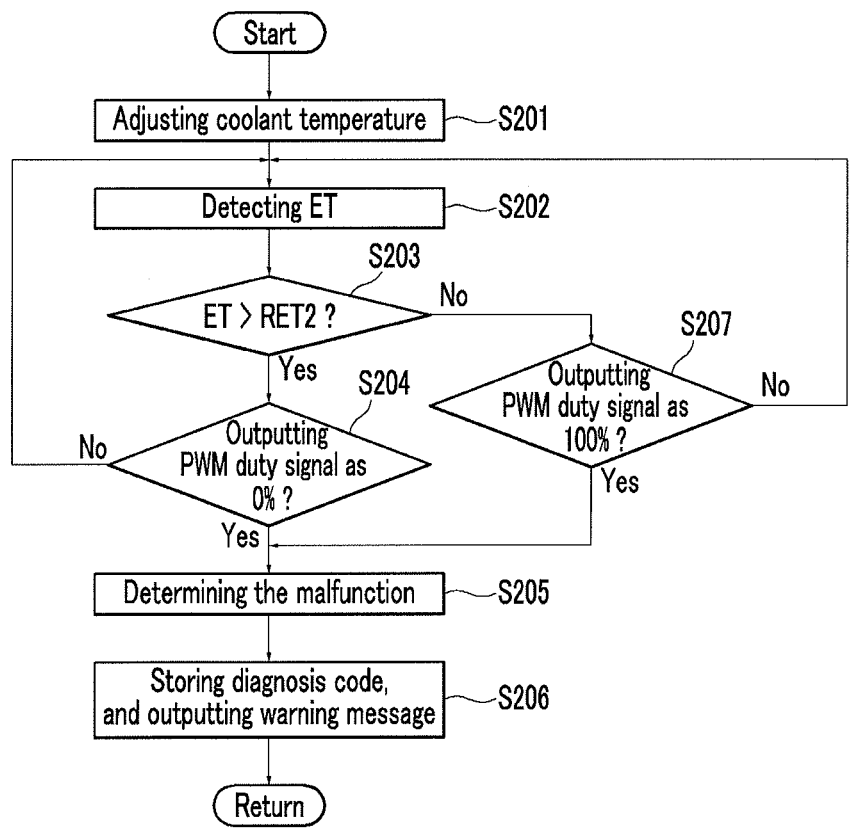
FIG. 4 is a flowchart of a fault diagnosis for an electronic thermostat control system according to an exemplary embodiment of the present invention.

FIG. 4 is a flowchart of a fault diagnosis for an electronic thermostat control system according to an exemplary embodiment of the present invention.

During the control of the heating value of the heater 20 for controlling the coolant temperature as shown in FIG. 3 at the step S201, the control portion 100 detects the coolant temperature ET at the step S202, and determines whether the coolant temperature ET is higher than the predetermined malfunction determination temperature RET2 or not at the step S203.

If the coolant temperature ET is higher than the predetermined malfunction determination temperature RET2 at the step S203, the control portion 100 determines whether the PWM duty signal is 0% for controlling the heating value of the heater 20 or not at the step S204.

If the PWM duty signal is 0% at the step the S204, the control portion 100 determines the malfunction of the electronic thermostat 15 at the step S205, stores diagnosis code, and outputs warning message through the indicating portion 200 at the step S206.

If the coolant temperature ET is not higher than the predetermined malfunction determination temperature RET2 at the step S203, the control portion 100 determines whether the PWM duty signal is 100% for controlling the heating value of the heater 20 or not at the step S207.

If the PWM duty signal is 100% at the step the S207, the control portion 100 determines the malfunction of the electronic thermostat 15 at the step S205, stores diagnosis code, and outputs warning message through the indicating portion 200 at the step S206.

If the coolant temperature ET is higher than the predetermined malfunction determination temperature RET2, the coolant needs to be cooled. However, in this case the PWM duty signal is output as 0%, it is determined that the system is out of order.

If the coolant temperature ET is not higher than the predetermined malfunction determination temperature RET2, the coolant needs not to be cooled. However, in this case the PWM duty signal is output as 100%, it is determined that the system is out of order.

The malfunction determination temperature RET2 is a temperature for determining whether malfunction of the system or not, and the malfunction determination temperature RET2 may be set through experiments.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings. arrangements included within the spirit and scope of the appended claims.

What is claimed is:

1. A control method for an electronic thermostat control system, comprising:
    detecting operation states of a vehicle including a coolant temperature, a rising rate of the detected coolant temperature, an engine speed, a load and a vehicle speed;
    determining whether the detected coolant temperature is within a predetermined temperature range;
    determining whether coolant temperature change satisfies a rising control condition or a descending control condition when the detected coolant temperature is within the predetermined temperature range, and adjusting the detected coolant temperature by controlling an operation of an electronic thermostat; and
    diagnosing malfunction of the electronic thermostat by comparing a target temperature with the detected coolant temperature controlled by the electronic thermostat,
    wherein a valve of the electronic thermostat is opened fully for a coolant flowing through a radiator maximized when the detected coolant temperature is higher than a maximum temperature of the predetermined temperature range; and
    wherein the valve of the electronic thermostat is closed fully for the coolant flowing through the radiator minimized when the detected coolant temperature is less than a minimum temperature of the predetermined temperature range.

2. The control method of claim 1, wherein the malfunction of the thermostat is determined when changes of the detected coolant temperature do not follow a target temperature, or the changes of the detected coolant temperature does not correspond to a control of the electronic thermostat, and after the malfunction of the thermostat is determined, warning message is output.

* * * * *